March 7, 1944.        E. MARTIN ET AL        2,343,383
MEANS AND METHOD OF BALANCING PROPELLERS
Filed April 11, 1941        4 Sheets-Sheet 1

INVENTORS
ERLE MARTIN
MURRAY C. BEEBE JR.
BY Harris G. Luther
ATTORNEY

March 7, 1944. E. MARTIN ET AL 2,343,383
MEANS AND METHOD OF BALANCING PROPELLERS
Filed April 11, 1941 4 Sheets-Sheet 2

INVENTORS
ERLE MARTIN
MURRAY C. BEEBE JR.
BY Harris G. Luther
ATTORNEY

March 7, 1944.   E. MARTIN ET AL   2,343,383
MEANS AND METHOD OF BALANCING PROPELLERS
Filed April 11, 1941   4 Sheets-Sheet 4

Fig.6

INVENTORS
ERLE MARTIN
MURRAY C. BEEBE JR.
BY Harris G. Luther
ATTORNEY

Patented Mar. 7, 1944

2,343,383

UNITED STATES PATENT OFFICE 2,343,383

MEANS AND METHOD OF BALANCING PROPELLERS

Erle Martin, West Hartford, and Murray C. Beebe, Jr., Glastonbury, Conn., assignors to United Aircraft Corporation, East Hartford, Conn., a corporation of Delaware Application April 11, 1941, Serial No. 388,104

21 Claims. (Cl. 73—53)

This invention relates to an improved method and apparatus for balancing aeronautical propellers and has particular reference to an improved method and apparatus for separately determining aerodynamic or dynamic unbalance in such a propeller.

An object of the invention resides in the provision of an improved method and apparatus for completely balancing an aeronautical propeller by separating the effect of aerodynamic unbalance from the effect of mass unbalance so that both of these vibration creating defects can be determined both as to location and magnitude and eliminated from the propeller.

A further object resides in the provision of a simple and effective apparatus for detecting the location and magnitude of aerodynamic unbalance and in an aeronautical propeller so that this factor of propeller unbalance can be eliminated before attempting to correct an out of balance condition of the propeller mass.

Other objects and advantages will be more particularly pointed out hereinafter or will become apparent as the description proceeds.

In the accompanying drawings, in which like reference numerals are used to designate similar parts throughout, there is illustrated a suitable constructional form of dynamic and aerodynamic unbalance determining apparatus for the purpose of disclosing the invention, and a some hat modified form of apparatus for determining the location and magnitude of aerodynamic unbalance. The drawings, however, are for the purpose of illustration only and are not to be taken as limiting or restricting the invention since it will be apparent to those skilled in the art that various changes in the illustrated constructional forms may be resorted to without in any way exceeding the scope of the invention.

In the drawings,

Fig. 8 is a detailed view of the screen hinge blocks.

In the manufacture of multiple blade aeronautical propellers it has been found that after such a propeller has been completely assembled, it may have at least two important conditions of unbalance which will produce undesirable vibrations during propeller operation. One of these is the condition in which the mass of the propeller is not symmetrically distributed about the axis of propeller rotation producing dynamic and/or static unbalance which condition will cause vibration of the propeller during operation. Dynamic vibration usually being caused by force couples which tend to cause the propeller disc to wobble about some point along the axis of propeller rotation and static unbalance being caused by a radial force which tends to cause the propeller disc to move radially. The other important condition is that of unequal aerodynamic effectiveness of the different propeller blades. In operation the aerodynamic forces acting on the several blades produce a thrust moment on each blade acting about an axis substantially perpendicular to the axis of rotation of the propeller and to the longitudinal axis of the blade. Because of slight variations in angle of attack or slight differences in the aerodynamic shape of the several blades one blade may produce a slightly greater or slightly lesser moment than the remaining blade or blades. This condition also gives the propeller a tendency to wobble when in operation.

When it is attempted to finally balance a propeller after assembly both of the above described conditions combine to produce vibrational effects and it is not usually possible to determine from a general vibrational analysis just what part of the total vibration is due to mass unbalance and what part is due to aerodynamic unbalance. It, therefore, becomes exceedingly difficult if not impossible to completely correct the mass unbalance of the propeller without separately determining the angular location and magnitude of both the aerodynamic unbalance and the dynamic unbalance. While both mass and aerodynamic unbalance might be corrected by a single adjustment of either the mass distribution or aerodynamic effects to place the propeller in satisfactory balance for operation at one altitude, the condition of balance thus obtained would not be effective at different altitudes since the mass effects will remain substantially constant but the aerodynamic effects will vary with changes in altitude. This is given as one example of the reasons for independently correcting defects leading to mass and to aerodynamic unbalance. As stated above, it is among the objects of this invention to produce an effective method and apparatus for determining and eliminating both the aerodynamic unbalance effect and the mass unbalance.

Figures 2, 3, 4:
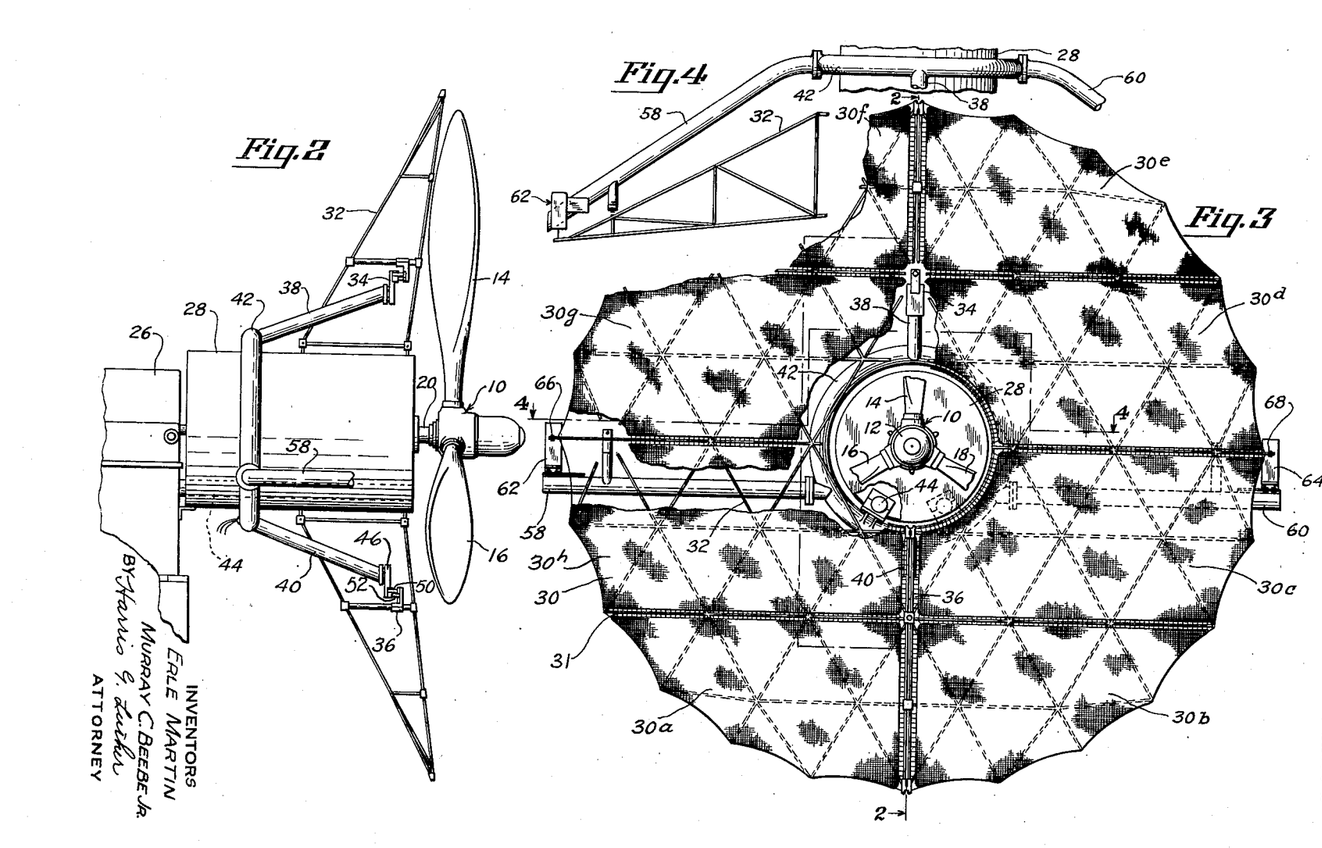
Fig. 2 is a side view of a fragmentary portion of the detecting device.
Fig. 3 is a front elevational view of a portion of the device illustrated in Fig. 2.
Fig. 4 is a fragmentary sectional view of the device taken on the line 4—4 of Fig. 3.

Referring to the accompanying drawings in detail, the numeral 10 generally indicates an aeronautical propeller which may be of some form well known to the art. The propeller illustrated has a hub portion 12 carrying three blades 14, 16 and 18 as indicated in Fig. 3.

In order to determine the aerodynamic and mass unbalance including both static and dynamic unbalance the propeller 10 is mounted on one end of a shaft 20 driven by a motor 22. The motor is supported on a machine base 24 a portion 26 of which carries a cylindrical extension 28 through which the shaft 20 extends and within which are disposed suitable bearings for supporting the drive shaft, as particularly illustrated in Fig. 5 and hereinafter described in detail. Surrounding the shaft 20 immediately to the rear of the propeller there is a substantially circular disc member 30 preferably formed of sections of wire mesh screen mounted on a supporting framework 32 which may conveniently be formed of welded lengths of light gauge tubing. The screen disc 30 may conveniently be formed of a plurality of sections, as indicated at 30a, 30b, 30c, 30d, 30e, 30f, 30g and 30h, in Fig. 3, secured together along their adjacent edges by rows of tensioning springs, as indictaed at 31. The disc member, including the screen 30 and frame 32, is supported independently of the shaft 20 and its bearings on vertically aligned pivotal mountings 34 and 36 carried at the ends of respective arms 38 and 40 secured to a ring 42 which surrounds the cylindrical member 28 and is mounted on the cylindrical member or on suitable supports, as indicated at 44, extending from the machine base portion 26. This disc member is preferably so constructed as to have a natural frequency of vibratory movement above the principal vibration frequencies of the propeller when rotating at balancing speeds. This is desirable to avoid a condition of resonance between the natural frequency of the disc structure and the principal aerodynamic disturbances which condition might produce distortions in the disc and lead to inaccuracies in the measurement of the aerodynamic unbalance.

While various forms of pivotal mountings might be used, it has been found convenient to form these mountings of two opposed blocks, as indicated at 46 and 48 for the block 36, having double beveled adjacent faces and secured together by leaf springs, as indicated at 50 and 52, which cross each other between the blocks which they secure together. The mounting 34 is identical with the mounting 36.

The ring 42 also carries a pair of arms 58 and 60 angularly disposed mid-way between the diametrically opposed arms 38 and 40 so that the center lines of the arms 58 and 60 lie substantially in a horizontal plane. Each of the horizontal arms 58 and 60 carries at its outer end an electrical pick-up device, as indicated at 62 and 64, and each pick-up device has a connection with the frame 32 as indicated at 66 and 68.

Each electrical pick-up device may comprise a permanent magnet 70 carried on the end of the respective arm 58 or 60, and a light weight coil, as indicated at 72, connected with the frame 32 to move therewith.

Figures 5, 6:
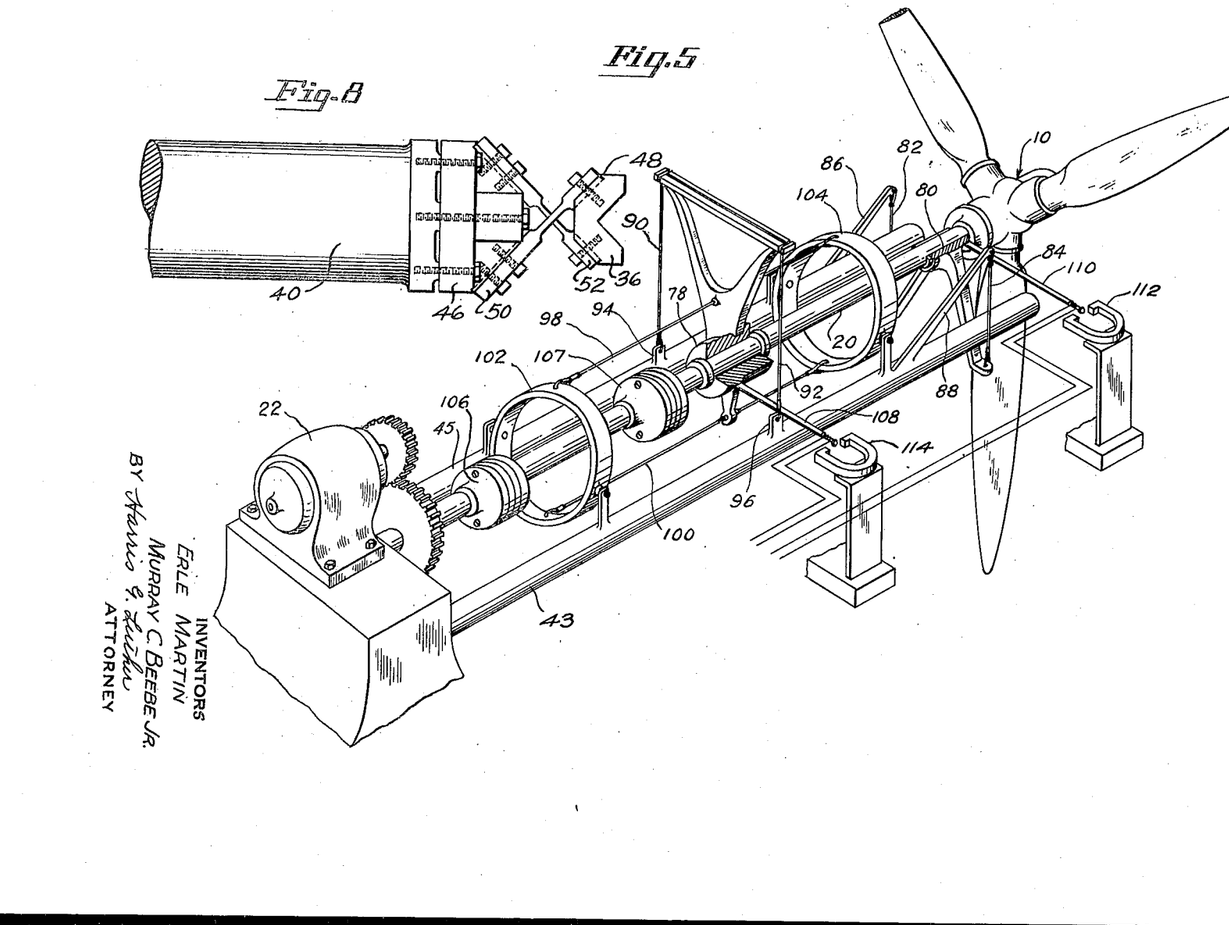
Fig. 5 is a perspective view of the propeller supporting and driving mechanism showing the devices for detecting dynamic unbalance of the propeller.
Fig. 6 is a schematic view of the electrical circuits of a propeller balancing machine for indicating the magnitude and angular position of vibrational effects caused by mass and aerodynamic unbalance of the propeller.
Figure 6:
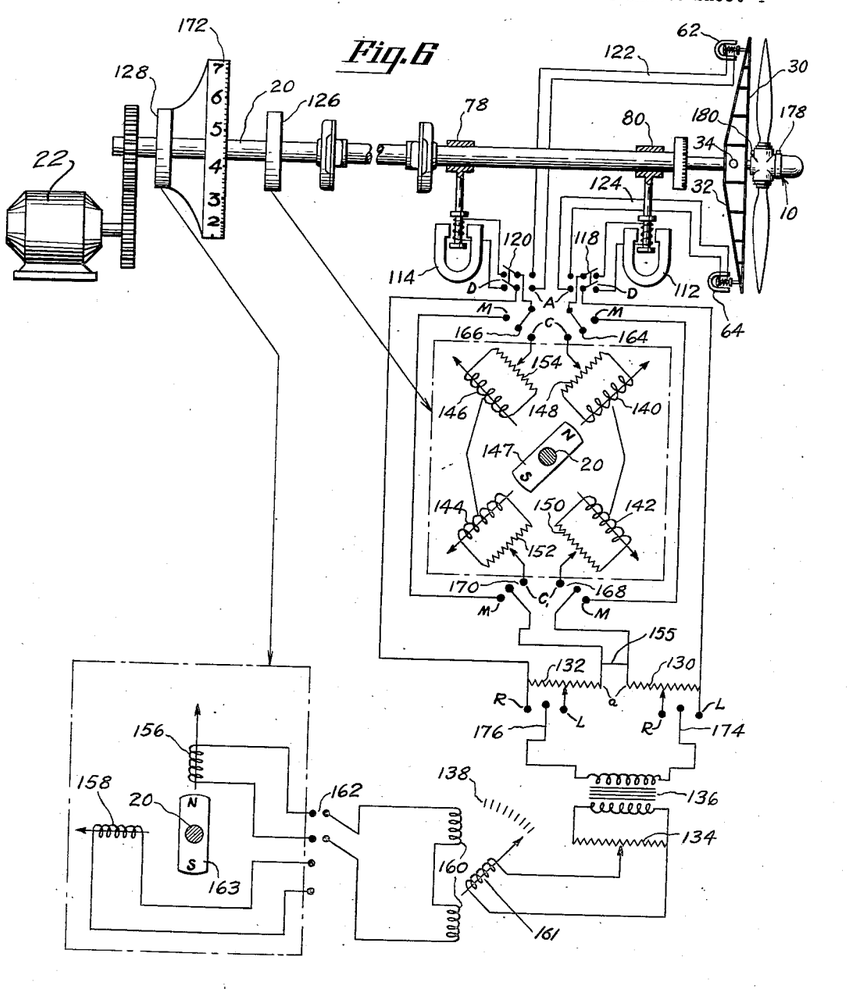

Referring now to Fig. 5 which is a perspective view of the driving and supporting means for the propeller shaft 20, it will be observed that the shaft is supported by two cantilever beams 45 and 43 in two bearings as indicated at 78 and 80 and driven by the motor 22. The bearing 80 is supported by suitable flexible means, such as the cables 82 and 84 extending downwardly from fixed supports such as the arms 86 and 88 mounted on the cantilever beams 45 and 43 and the bearing 78 is supported by similar cables 90 and 92 extending upwardly from suitable fixed supports such as the arms 94 and 96. This support together with the above-described support for screen 30 insulates the screen from vibrations of the shaft 20 and its bearings. The difference in the directions in which the respective bearing supporting cables extend is occasioned by the overhang of the shaft 20, the weight of the shaft and the propeller causing a downward force on the bearing 80 and an upward force on the bearing 78. The propeller thrust is transmitted through the bearing 78 to the longitudinally extending cables 98 and 100 connected to their ends to the rings 102 and 104 pivotally secured to the fixed portion of the machine while permitting the bearing to follow the movements of the shaft 20. Flexible couplings 106 and 107 providing a limited universal action to provide freedom of movement of the shaft 20 under the influence of propeller unbalance and prevent disturbances incident to motor and motor drive unbalance being transmitted to the shaft, are incorporated between the motor drive shaft and the adjacent end of the shaft 20.

Each of the bearings 78 and 80 carries a lateral projection, as indicated at 108 and 110, respectively, the outer ends of which actuate electric pick-up devices, as indicated respectively at 112 and 114, each of these pick-ups comprising a permanent magnet and a movable coil as indicated above for the pick-ups connected with the pivoted diaphragm 30.

With this arrangement lateral movements of the shaft 20 occasioned by vibration of the propeller 10 can be electrically indicated.

Figure 1:
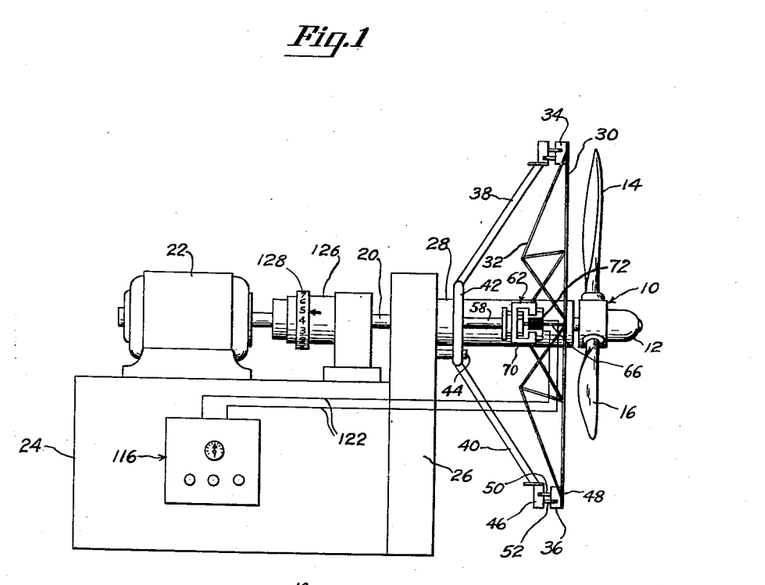
Fig. 1 is a schematic side-elevational view of a propeller aerodynamic unbalance detecting device constructed according to the invention.

Electrical leads from the pick-ups 62 and 64 and from the pick-ups 112 and 114 are carried to an electrical analyzing device generally indicated at 116 in Fig. 1 and diagrammatically illustrated in Fig. 6.

In applying this apparatus to balancing an aeronautical propeller, the propeller is mounted on the end of the shaft 20 adjacent to the screen 30 and is rotated by the motor 22 at a speed at which aerodynamic unbalance of the propeller blades will produce a definite effect on the propeller wake. It has been found experimentally that a propeller speed of approximately six hundred revolutions per minute is sufficient to produce these effects, but it may be found desirable to rotate the propeller at speeds nearer the usual propeller operating speeds if it should become necessary to obtain more exact measurement in practice. With the propeller rotating at some selected speed at which the aerodynamic unbalance of the propeller blade is measurable within the desired degree of accuracy, the switches 118 and 120 will be positioned to connect the leads 122 and 124 from the respective pick-ups 62 and 64 with the electrical system of the machine. This electrical system includes a compensating generator 126, a measuring generator 128, potentiometers 130, 132 and 134, an amplifying device 136 and a wattmeter 138.

The compensating generator 126 has four stator field coils 140, 142, 144 and 146 disposed ninety degrees apart and mounted in a fixed support and an armature 147 comprising a permanent magnet fixed on the shaft 20. Each of these coils is connected in series with a variable resistance or potentiometer as indicated at 148, 150, 152 and 154, respectively.

The coils 140 and 142 arranged at ninety degrees to each other and for convenience called the zero degree and two hundred and seventy degree coils, respectively, are connected in series and coils 144 and 146 called for convenience the one hundred and eighty degree and ninety degree coils, respectively, are also connected in series. Coil 140 is connected with one switch point C and coil 146 is connected with another switch point C through which they may be connected with one side of a pick-up. Coil 142 is connected with one switch point $C_1$ and coil 144 is connected to another switch point $C_1$ through which they may be connected through various mechanism with the other side of the pick-up. When switches 168 and 170 are on switch points $C_1$ coils 142 and 144 are connected in series by connection 155.

The measuring generator 128 has two field or stator coils 156 and 158 and a permanent magnet armature 163 fixed on the shaft 20. The coils 156 and 158 are spaced ninety degrees apart and are mounted on a rotatable support 172 so that their position relative to the fixed support and to the fixed coils of the compensating generator may be changed at will. For convenience coil 156 is called the zero degree coil and 158 the ninety degree coil.

The wattmeter has a current coil 160 selectively connectible with either coil 156 or 158 of the measuring generator and a coil 161 connected with the amplifying device 136 of the electrical system. As is well known, if no voltage is impressed on the voltage coil the wattmeter will show a zero reading even if current is flowing in the current coil, and as the power of an alternating circuit is expressed by EI cos $\theta$, where $\theta$ is the phase angle between the voltage E and the current I, the wattmeter will also show a zero reading if the current and voltage impulses are ninety degrees out of phase.

After the pick-ups 62 and 64 have been connected with the electrical circuit by the switches 118 and 120, the compensating generator 126 is connected into the circuit by closing the switches 164, 166, 168 and 170 with the corresponding calibrating or "C" contacts. The pick-ups 62 and 64 are connected in series so as to assist each other and have their voltages add, although they will always be moving in opposite directions. It might be stated that only one pick-up is essential but the provision of two tends to cancel impulses produced by certain machine or outside vibrations. The pick-ups are connected into the system so that the impulses travel from one pick-up through the amplifier, switch 176 being connected with R and switch 174 being connected with L, through the other pick-up, then through the four coils of the compensating generator and hence back to the first pick-up. The compensating generator is used solely to electrically balance out any voltage that may be generated by the pick-up 62 and 64 due to any unbalance of the propeller originally selected to start the tests, thus avoiding the necessity of obtaining a perfectly balanced propeller for calibrating the indicating portions of the machine. When the movable support 172 is placed in its zero position the zero degree coil 156 of generator 128 and the zero degree coil 140 of generator 126 will be in position such that current and voltage impulses induced in the respective coils will be in phase. With the support 172 in such position and switch 162 connecting coil 156 with the wattmeter current coil 160 and with potentiometer 152 set to neutralize voltages induced in coil 144, the watt-meter will indicate a reading when voltage produced in coil 140 does not completely nullify voltage of the same phase produced in pick-ups 62 and 64. By adjusting the resistance 148 the voltages can be made equal and opposite so that the wattmeter will show no reading. By now moving switch 162 to connect coil 158 with the circuit and with potentiometer 150 set to neutralize voltages induced in coil 142, voltages induced in coil 146 will be in phase with current induced in coil 158. Resistance 154 may then be adjusted to nullify the voltage induced, in that same phase by the pick-ups 62 and 64. By this operation the voltages produced in the pick-ups by initial propeller unbalance are exactly nullified by voltages produced in the coils of the compensating generator and the effect has been to adjust the electrical system to simulate the conditions which would exist if a perfectly balanced propeller has been installed.

With the machine in the position last described we may now proceed to locate and measure the aerodynamic unbalance. Measurement of the aerodynamic thrust unbalance of the propeller involves the selection of one of the propeller blades as a reference blade and comparing successively, the thrust moment of the other two blades with that of the reference blade. To accomplish this, let it be assumed that blade number 16, as indicated on Fig. 3, is to be used as a reference for the comparison. Blade number 14 is now adjusted through a known angle, for example, one degree in increase in pitch. Additional voltages will now be produced by the pick-ups 62 and 64 and will provide a reading on the wattmeter 138. The measuring generator stator 172 will now be rotated until the reading of the wattmeter 138 is returned to zero. This will indicate that the current impulses of the ninety degree coil of generator 128 and the voltage impulses of the pick-ups 62 and 64 induced by the extra thrust of blade 14 are ninety degrees out of phase with each other. In this position of the measuring generator stator the electric system will not indicate unbalance in blade number 14 and this position of the stator is, therefore, the correct setting for reading the unbalance produced by either of the other two blades 18 or 16. As blade 16 has been chosen for reference, the generator stator setting is the correct one for measuring the correction which must be applied to blade 18. Therefore, in using this machine with this propeller whenever we wish to measure the unbalance in blade 18 the stator 172 will be returned to the above position and the wattmeter reading noted.

If the measuring generator stator 172 is now rotated one hundred and twenty degrees clockwise as seen in Fig. 3, its position will be that in which the network will not measure the unbalance in blade 18; that is, it is in the proper position for measuring the unbalance in either blade 14 or 18. Again, since blade 18 has been selected as the reference blade, this generator position is the proper one for determining the correction to be applied to blade 14. As blade 14 now has a known uncompensated unbalance aerodynamically, the wattmeter will show a reading. With the generator in this last mentioned position, the variable resistance or potentiometer 134 is adjusted so that the wattmeter 138 indicates the angle in degrees through which the blade 14 was arbitrarily changed, that is, one degree for the illustration given above.

The machine has now been calibrated both for locating the blade whose unbalance is to be measured and for indicating the quantity of that unbalance in degrees of pitch setting. It is now ready for measuring the initial propeller unbalance. Still having the machine set as last described above the compensating generator 126 is eliminated from the circuit by changing the switches 164, 166, 168 and 170 from the switch points indicated by C on the accompanying drawings to the switch points indicated by M. The wattmeter 138 will now read the pitch angle correction to be applied to blade number 14. After the correction to be applied to blade number 14 is determined the measuring generator stator is rotated one hundred and twenty degrees to the original calibrating position and the wattmeter will then indicate the pitch angle correction for blade number 18.

Adjusting blades number 14 and 18 in accordance with the indicated corrections of the wattmeter will make the aerodynamic thrust moment produced by these blades equal, respectively, to the thrust moment produced by blade number 16 and the propeller will be in aerodynamic balance.

After the aerodynamic unbalance has been eliminated from the propeller the switches 118 and 120 will be shifted from the point indicated by A in Fig. 6 of the accompanying drawings to the point indicated by D thus disconnecting pick-ups 62 and 64 and connecting the pick-ups 112 and 114 with the electrical system and placing the apparatus in condition to measure the mass unbalance of the propeller.

In determining the mass unbalance the following procedure should be followed:

The movable field or stator 172 of the measuring generator 128 is moved to its zero degree angular position so that the zero degree coil 156 of this generator and the zero degree coil 140 of the compensating generator 126 will produce a current and a voltage, respectively, exactly in phase with each other. The switches 118 and 120 being in contact with the points marked D on Fig. 6 of the accompanying drawings, when the propeller 10 is rotated, electrical currents from the electrical pick-ups 112 and 114 will be fed into the electrical system. The switches 164 and 166 are on the contacts indicated by C and switches 168 and 170 are on the contacts indicated by C₁ in order to connect the compensating generator 126 into the system so that the voltages produced by this generator will be in series with the voltage generated in the electric pick-ups 112 and 114. In measuring the mass balance, however, the potentiometers 130 and 132 will be changed so that the movable contacts are brought to the position indicated by a in each case and the switches 174 and 176 will be placed in the position indicated by the letter L so that only the pick-up 112 and the zero and two hundred and seventy degree coils 140 and 142 of the compensating generator 126 will be effective to energize the amplifying device 136 the resistance of potentiometer 132 being sufficient to effectively block out the pick-up 114. Now, with the switch 162 in position to connect the zero degree coil 156 of the measuring generator 128 with the current coils of the wattmeter 138, the wattmeter will indicate the combined voltage generated in the pick-up 112 and coil 140 which is in phase with that generated in coil 156. By now adjusting the potentiometer 148 which is in series with this coil it is possible to make the resultant voltage zero and thus obtain a zero reading on the wattmeter 138. Under these conditions, the coil 140 of the compensating generator will be producing a voltage one hundred and eighty degrees out of phase with the zero degree component of the voltage output of the electric pick-up 112 and of exactly the same magnitude.

After the above mentioned zero reading of the wattmeter has been obtained switch number 162 should be moved to connect the ninety degree coil 158 with the wattmeter so that the wattmeter will now measure the remaining components of the voltage generated by the electrical pick-up 112. The potentiometer 150 across the two hundred and seventy degree coil 142 of the compensating generator is now adjusted to again reduce the wattmeter reading to zero. With this arrangement the voltage generated by the electrical pick-up 112 is exactly compensated by the component voltages generated in the zero degree and two hundred and seventy degree coils 140 and 142 of the compensating generator 126. Now if switches 174 and 176 are thrown in the R position and a similar procedure is followed in adjusting the potentiometers across the one hundred and eighty degree and ninety degree coils 144 and 146 of the compensating generator, it will be possible to exactly compensate for the voltage being generated in the electrical pick-up 114. The machine has now been adjusted so as to be electrically balanced, that is, the compensating elements of the machine are so adjusted as to simulate the conditions which would exist if a propeller having perfect mass and aerodynamic balance were mounted on the shaft 20.

Now an unbalance is introduced into the system by adding a small weight 178 to the propeller in a predetermined plane parallel to the plane of rotation and at a distance from the axis of rotation and in line with the zero degree rotational position as determined by the location of the field coils and rotor of the measuring generator 128. This unbalance will cause additional movement of both pick-ups 112 and 114 and cause additional voltages to be generated by these pick-ups in phase with the current generated in coil 156 of the measuring generator 128. Switches 164, 166, 168 and 170 are left at the C compensating position and switch 162 is positioned to connect the zero degree coil 156 of the measuring generator with the fixed or current coils of the wattmeter and switches 174 and 176 are set to the R position to indicate the movement of pick-up 114. The wattmeter should now be made to read zero by adjusting the potentiometer 130 which will in effect utilize some of the voltage induced by pick-up 112 to oppose the voltage of pick-up 114. Under these conditions the zero wattmeter reading indicates that a sufficient portion of the output of the pick-up 112, which is in electrical opposition with the pick-up 114, has been combined with the latter to nullify it completely. Thus, there will be no indication in pick-up 114 of unbalance in the plane of weight 178. The unbalance first added and indicated at 178 is now removed and a known unbalance 180 is placed on the propeller a known distance from the axis of rotation, in a different plane parallel to the plane of propeller rotation and in line with the zero degree rotational position of the machine. The wattmeter will now indicate unbalance in the plane of weight 180 caused by unbalance weight 180. By adjusting the variable potentiometer 134 the wattmeter reading may be changed or calibrated to read this known unbalance in this known plane in any desired unit.

The balance disturbing weights 178 and 180 may be conveniently mounted on the propeller by providing balanced rings surrounding the propeller hub at each side of the blade supporting portion of the hub and securing suitable weights to these rings.

Similar nullification and calibration operations may be carried out for unbalance in the plane of weight 178 by moving switches 174 and 176 to the L position and adjusting the potentiometer 132 to give a zero indication on the wattmeter of the unbalance produced by weight 180. The unbalance weight 180 is now removed from the propeller and the unbalance weight 178 of known value is again put in position on the propeller and the potentiometer 134 adjusted to cause the wattmeter 138 to read this known unbalance in a desired correction unit.

The machine has now been completely calibrated and if the unbalance weights 178 and 180 are removed from the propeller and the switches 164, 166, 168 and 170 are moved to the M position, the compensating generator 126 will be taken out of the circuit and it will be possible to exactly determine the amount and angular position of the original unbalance in the propeller in the planes of correction determined by the positions of the above mentioned rings. For example, in order to find the effect of unbalance in one plane of correction defined by the plane in which weight 178 was placed, switches 174 and 176 are thrown to the L position and switch 162 to the position to connect the ninety degree coil 158 with the wattmeter. If now a reading is observed on the wattmeter the stator 172 of the measuring generator 128 is rotated until a zero reading on the wattmeter is obtained. The angular position indicated by this changed position of the stator of the measuring generator will indicate directly the angular position of the unbalance in the selected plane of correction. If switch 162 is now thrown to the position to connect the zero degree coil 156 with the wattmeter the current and voltage introduced to the wattmeter will be in phase and the wattmeter will indicate directly in the selected units of correction the amount of unbalance to be compensated for in the selected plane of correction.

If now the switches 174 and 176 are thrown to the R position and switch 162 is positioned to connect the ninety degree coil 158 with the wattmeter and potentiometer 134 is returned to the position determined during calibration with the weight 180, the stator 172 of the measuring generator may be again moved to give a zero wattmeter reading thereby indicating the angular position of the unbalance in the other plane of correction i. e. the plane defined by the weight 180. Changing the position of the switch 162 to now connect the zero degree coil 156 of the measuring generator with the wattmeter will indicate the amount of correction to be made in this other plane of correction in the selected units of correction.

With the completion of the indicated correction for mass unbalance and with the aerodynamic unbalance already having been corrected by promptly setting the blades to the correct pitch angle, the propeller will now be in aerodynamic and mass balance.

Figures 7, 7A:
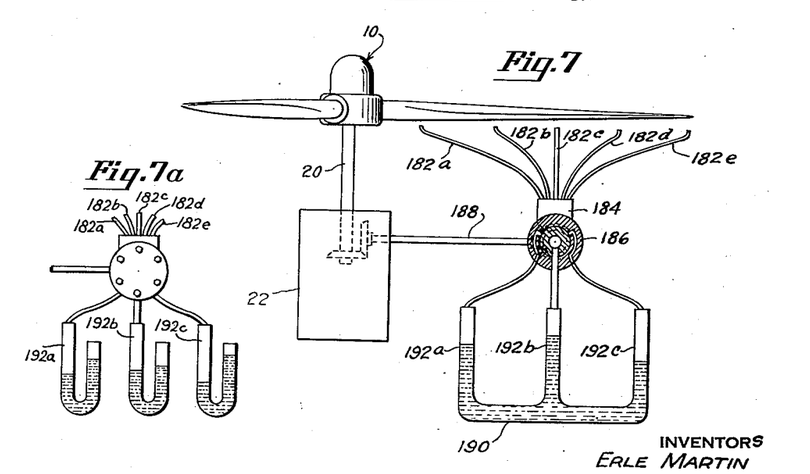
Fig. 7 is a schematic illustration of a somewhat modified form of propeller aerodynamic unbalance detecting device.
Fig. 7a is a modification of Fig. 7.

In the arrangement illustrated in Fig. 7 the propeller is mounted on a shaft 20 driven by a motor 22 in the manner indicated above and the motor and shaft may be supported on machine base portions such as indicated at 24 and 26 in Fig. 1 if desired. A plurality of Pitot tubes, as indicated at 182a, 182b, 182c, 182d and 182e are arranged along a radiant extending outwardly from the axis of rotation of the propeller 10 and may be spaced along this radiant as may be found convenient or desirable for obtaining the most desirable indication of the aerodynamic effect produced in the wake of the propeller blades. All of these Pitot tubes lead into a pressure chamber 184 to one end of which is connected a rotatable valve 186 which is rotated in synchronism with the propeller by suitable means, such as the drive shaft 188 operatively connected between the motor 22 and the valve. A compound manometer 190 having three legs as indicated at 192a, 192b, and 192c is connected with the valve 186 in such a manner that one of the legs is connected with the pressure chamber 184 each time one of the propeller blades sweeps across the open ends of the Pitot tubes. Thus, there will be a respective manometer leg for each respective propeller blade and the level of the liquid in a particular manometer leg will be indicative of the aerodynamic effect produced by the corresponding propeller blade. When the propeller is rotated at speed the liquid levels in the various manometer legs will remain near certain indicative positions and a comparative estimate of the aerodynamic effect produced by the several blades can be obtained from an observation of the height of the liquid columns in the various manometer legs. With such an observation the propeller blades can be adjusted to decrease the difference in the aerodynamic effect produced and a condition of substantially perfect aerodynamic balance will be obtained when the liquid columns all have the same level in the respective legs of the compound manometer. If desired a separate manometer for each blade can be used without in any way exceeding the scope of the invention.

While a suitable mechanical arrangement and one somewhat modified form thereof has been hereinabove described and illustrated in the accompanying drawings for the purpose of disclosing the invention, it is to be understood that the invention is not limited to the particular arrangements so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. Apparatus for indicating the angular position with respect to the blades of a multi-blade aerodynamic propeller at which a vibration producing aerodynamic effect is produced when the propeller is rotated at operating speed comprising, means for supporting and rotating the propeller, a diaphragm pivotally supported immediately to the rear of the propeller position, a motion responsive device, including means for producing impulses upon movement of said diaphragm, operatively connected to said diaphragm, and means for correlating the impulses of said motion responsive device with the angular position of the propeller at the time the motion of the diaphragm occurs.

2. Apparatus for indicating the angular position with respect to the blades of an aerodynamic propeller at which a vibration producing aerodynamic effect is produced when the propeller is rotated at operating speed comprising, means for supporting and rotating the propeller, a diaphragm pivotally supported immediately to the rear of the propeller position on pivots positioned along a diameter of said diaphragm, a motion responsive device, including means for producing impulses upon movement of said diaphragm, operatively connected to said diaphragm at a location between said pivots and spaced from said diameter, and means for correlating the impulses of said motion responsive device with the angular position of the propeller at the time the motion of the diaphragm occurs.

3. Apparatus for indicating the angular position with respect to the blades of an aerodynamic propeller at which a vibration producing aerodynamic effect is produced when the propeller is rotated at operating speed comprising, means for supporting and rotating the propeller, a diaphragm pivotally supported immediately to the rear of the propeller position on pivots positioned along a diameter of said diaphragm, an electric current generating device supported adjacent to said diaphragm at a position between said pivots and spaced from said diameter and operatively connected with said diaphragm, and means for comparing the current signals from said generating device with current signals from a different generating device the signal strength and timing of the signals of which relative to the rotational position of the propeller is known.

4. Apparatus for indicating which one of the several blades of a multi-blade propeller produces a balance disturbing aerodynamic effect comprising, a Pitot tube mounted immediately behind the propeller position and in the propeller wake with its open end directed into the airflow from said propeller, a plurality of manometer tube legs, one for each propeller blade, and a valve driven in synchronism with the propeller for connecting said manometer legs seriatim with said Pitot tube as the corresponding propeller blades pass the open end of said tube.

5. Apparatus for indicating which one of the several blades of a multi-blade propeller produces a balance disturbing aerodynamic effect comprising, a plurality of Pitot tubes mounted immediately behind the propeller position with their open ends directed into the airflow from the propeller and distributed within an area substantially the same as the face area of a propeller blade, a plurality of manometer tube legs one for each propeller blade, a chamber connected with all of said Pitot tubes, and a valve driven in synchronism with the propeller for connecting said manometer legs seriatim with said chamber as the corresponding propeller blades pass the open ends of said manometer tubes.

6. A propeller balancing method which comprises, rotating the propeller on a fixed mount at a speed sufficient to produce in the propeller wake aerodynamic disturbances characteristic of aerodynamic unbalance of the propeller, measuring the magnitude of only such disturbances in a region spaced from said propeller and in a selected portion of the propeller disc, timing said measurements with the passage of the various propeller blades through said selected disc portion, and correcting the aerodynamic unbalance by adjusting the propeller blade in accordance with said timed measurements.

7. Apparatus for detecting and indicating thrust unbalance in a fluid displacing rotor comprising, means for supporting said rotor and rotating it at a speed sufficient for the rotor blades to produce a definite fluid movement in the wake of the rotor, and means, located in said rotor wake and spaced from said rotor, transforming at least a portion of the fluid movement in said wake into fluid pressure proportional to said fluid movement, means energized by the effect of said fluid pressure for indicating thrust effects produced by the several rotor blades including means correlating the aerodynamic effect indications in the rotor wake with corresponding blades.

8. Apparatus for detecting and indicating aerodynamic unbalance in a multi-blade aeronautical propeller comprising, mechanism for supporting said propeller and rotating it with respect to said detecting apparatus at a speed sufficient for the propeller blades to produce a definite air movement in the wake of the propeller, means located in said propeller wake energized by impingement of the air in the wake of said propeller on said means, a device operatively connected with said means for indicating differences in the air movement in the propeller wake effected by the several propeller blades, and means for correlating said differences with the corresponding blades.

9. Apparatus for indicating which of the several blades of a multi-blade propeller produces a balance disturbing aerodynamic effect comprising, means for supporting said propeller and means for rotating said propeller, non-rotatable detecting means independent of said first mentioned means and movement thereof and spaced from, and disposed immediately to the rear of, the propeller and energized by propeller slip stream air impinging thereon for detecting said balance disturbing aerodynamic effect, means actuated by said detecting means for indicating the disturbing aerodynamic effects and means synchronized with the rotation of said propeller and operatively associated with said indicating means for indicating the propeller blade or blades creating said effect.

10. Apparatus for indicating the angular position with respect to the blades of a multi-blade propeller at which a vibration producing aerodynamic effect is produced when the propeller is rotated at operating speed comprising, means including a shaft and bearings for supporting and rotating the propeller, non-rotatable airflow responsive detecting means supported independently of said shaft and bearings and positioned immediately to the rear of the propeller position and energized by propeller slip stream air impinging thereon for detecting said vibration producing aerodynamic effect, means actuated by said detecting means for indicating said effect, and means synchronized with the rotation of the propeller and operatively associated with said detecting means for indicating the angular position with respect to the propeller blades at which said effect occurs.

11. Means for detecting, locating and measuring aerodynamic unbalance in a propeller mounted on a rotating drive shaft comprising, means mounted independently of said propeller and drive shaft for transforming air velocity in an airstream into air pressure and utilizing that air pressure for individually measuring the relative energy imparted to the air stream by each rotating propeller blade as it passes a given point, including means for indicating which blade imparted the measured energy and the quantity of that energy relative to the energy imparted by another blade.

12. Means for determining propeller aerodynamic unbalance by individually observing the effect produced upon an air stream by each blade of a rotating propeller comprising, a device, with respect to which the propeller rotates, spaced from said propeller and located in the air stream produced by the propeller, said device including, means energized by air in said airstream impinging thereon, by absorbing at least a portion of the energy in said air stream, and connected with indicating means for indicating the effect of said air stream on said means and hence the effect of the propeller blades on the air stream, means for correlating such indications to particular blades, and means for indicating the quantity of the effect on the air stream produced by each blade.

13. In combination with mechanism adapted to be connected with means actuated by mass unbalance vibrations of a propeller to locate the direction and quantity of unbalance in each of two spaced planes, a device located in the propeller slipstream and movable by air of said slipstream, having periodic variations in velocity, impinging thereon, means for detecting the movement of said device, and means for connecting said detecting means with said mechanism for utilizing said mechanism for locating the position with respect to said propeller blades and the quantity of said periodic variations to thereby determine the correction to be applied to each blade to produce a propeller slipstream without periodic variations.

14. In combination with mechanism, adapted to be connected to an electrical impulse generator actuated by vibratory movements of a propeller and when so connected measuring and locating the electrical impulses with respect to said propeller so as to indicate the location and quantity of mass unbalance, means located in the propeller slipstream energized by air in said slipstream impinging thereon and movable by periodic variations in the velocity of the slipstream relative to a fixed point, a device operated by movement of said means for converting said movements into electrical impulses, and means for connecting said device with said mechanism for utilizing the electrical impulses of said device to locate and measure the quantity of aerodynamic unbalance of said propeller.

15. The method of determining and correcting the aerodynamic unbalance of a propeller having a plurality of blades which comprises, rotating the propeller at a speed sufficient to produce characteristic aerodynamic disturbances in the propeller slipstream, selecting a blade as a reference blade, determining the differences between the effect produced on an object by impingement on said object of the slipstream created by said reference blade and the respective effects produced on said object by the slipstream created by each blade other than the reference blade by measuring the effect of said slipstream on said object and timing said measurements with the rotation of said propeller and adjusting each blade other than the reference blade in accordance with said differences so as to make the effects all the same.

16. The method of completely balancing an aeronautical propeller having a plurality of blades by correcting both dynamic and aerodynamic unbalance which comprises, first supporting and rotating said propeller, measuring the effect of variations in the slipstream of the rotating propeller by measuring in timed relation with the rotation of said propeller the effect of impingement of said slipstream on an object for determining the aerodynamic unbalance between the respective blades of said propeller without regard to the dynamic unbalance, eliminating said aerodynamic unbalance and again rotating said propeller and with the aerodynamic defects eliminated determining the dynamic unbalance, and then eliminating said dynamic unbalance.

17. The method of determining aerodynamic unbalance of the blades of a propeller which is rotating at a speed sufficient to produce characteristic aerodynamic disturbances in the propeller wake, which comprises, measuring the effects produced by air in said wake, energized by certain blades, impinging on an obstruction located in said wake, and timing said measurements with the rotation of said propeller.

18. The method of determining aerodynamic unbalance caused by a blade of a multi-bladed propeller which comprises rotating said propeller in front of an obstruction at a speed sufficient to produce characteristic aerodynamic disturbances in the propeller wake, measuring the effects on said obstruction of variations in air current impinging thereon and timing said measurements with respect to said rotating propeller so that the effect observed is the effect caused by the aerodynamic unbalance of one blade.

19. The method of detrmining aerodynamic unbalance caused by a blade of a multi-bladed propeller which comprises rotating said propeller in front of an obstruction at a speed sufficient to produce characteristic aerodynamic disturbances in the propeller wake, measuring the effects on said obstruction of variations in air current impinging thereon, selecting a blade as a reference blade and timing said measurements with respect to said rotating propeller so that the difference between the effects of one blade and the effect of said reference blade are observed, which difference will be a measure of the aerodynamic unbalance of said one blade.

20. The method of determining the aerodynamic unbalance of a rotating three bladed propeller, having a first, second and third blade, by measuring the effects of the differences in the air velocities, produced by the several blades, on an obstruction in the slipstream of said propeller which comprises taking one set of measurements timed with respect to said rotating propeller so that the effect of the velocity produced by the first blade is eliminated and only the effect of the differences in the velocities produced by the second and third blades is observed, taking another set of measurements timed with respect to said rotating propeller so that the effect of the velocity produced by the third blade is eliminated and only the effect of the differences in the velocities produced by said first and second blade is observed whereby, by selecting said second blade as a standard, said timed measurements indicate the aerodynamic unbalance, with respect to said second blade, of said third blade and said first blade respectively.

21. Apparatus for indicating the aerodynamic unbalance of a three bladed propeller comprising, means for supporting and rotating said propeller, means, mounted independent of said supporting means, for measuring variations in the velocity of the slipstream of said propeller, mechanism eliminating from said measuring means the effect of one blade on said slipstream and measuring only the variations in velocity produced by the second and third blades, means for adjusting said mechanism to eliminate from said measuring means the effect of said third blade on said slipstream and measuring only the variations in the velocity produced by said one blade and said second blade.

ERLE MARTIN.
MURRAY C. BEEBE, Jr.